US012619590B2

(12) United States Patent
Fu et al.

(10) Patent No.: US 12,619,590 B2
(45) Date of Patent: May 5, 2026

(54) METHOD AND APPARATUS FOR PUBLISHING SMART CONTRACT, COMPUTER-READABLE MEDIUM,AND ELECTRONIC DEVICE

(71) Applicant: TENCENT TECHNOLOGY (SHENZHEN) COMPANY LIMITED, Shenzhen (CN)

(72) Inventors: Bo Fu, Shenzhen (CN); Maocai Li, Shenzhen (CN); Wei Shi, Shenzhen (CN); Li Kong, Shenzhen (CN); Yanxue Chong, Shenzhen (CN); Yehui Huang, Shenzhen (CN); Jiangwei Ti, Shenzhen (CN); Jiahui Cui, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 374 days.

(21) Appl. No.: 17/944,445

(22) Filed: Sep. 14, 2022

(65) Prior Publication Data

US 2023/0004542 A1 Jan. 5, 2023

Related U.S. Application Data

(63) Continuation of application No. PCT/CN2021/107240, filed on Jul. 20, 2021.

(30) Foreign Application Priority Data

Sep. 10, 2020 (CN) .......................... 202010944766.0

(51) Int. Cl.
G06F 16/22 (2019.01)
G06F 8/65 (2018.01)
(Continued)

(52) U.S. Cl.
CPC ............ *G06F 16/2255* (2019.01); *G06F 8/65* (2013.01); *G06F 8/71* (2013.01); *G06F 16/2272* (2019.01); *H04L 9/50* (2022.05)

(58) Field of Classification Search
CPC .... G06F 16/2255; G06F 16/2272; G06F 8/65; G06F 8/71; H04L 9/50
See application file for complete search history.

(56) References Cited

U.S. PATENT DOCUMENTS

2018/0137465 A1* 5/2018 Batra ..................... H04L 67/104
2018/0260212 A1* 9/2018 Wisnovsky ........... G06F 16/134
(Continued)

FOREIGN PATENT DOCUMENTS

CN 108510389 A * 9/2018 ........... G06Q 20/389
CN 109978477 A 7/2019
(Continued)

OTHER PUBLICATIONS

China National Intellectual Property Administration (CNIPA) Office Action 1 for 202010944766.0 Nov. 2, 2022 12 Pages (including translation).
(Continued)

*Primary Examiner* — Lewis A Bullock, Jr.
*Assistant Examiner* — Theodore E Hebert
(74) *Attorney, Agent, or Firm* — Anova Law Group, PLLC

(57) ABSTRACT

A method for publishing a smart contract includes: generating a version number index value according to a contract name of the smart contract, and searching for an associated target contract version number from a blockchain network according to the version number index value; generating a contract index value according to a contract version number of the smart contract and the contract name, in response to determining that the contract version number of the smart (Continued)

Generate a version number index value according to a contract name of a smart contract to be published, and search for an associated target contract version number from a blockchain network according to the version number index value — S510

Generate a contract index value according to a contract version number and the contract name of the smart contract to be published, in a case that the contract version number of the smart contract to be published is greater than the target contract version number — S520

Associate the contract index value with the smart contract to be published and associate the version number index value with the contract version number of the smart contract to be published, to generate transaction information — S530

Publish the transaction information to the blockchain network, to publish the smart contract to be published to the blockchain network — S540 contract is greater than the target contract version number; associating the contract index value with the smart contract and associating the version number index value with the contract version number of the smart contract, to generate transaction information; and publishing the transaction information to the blockchain network, to publish the smart contract to the blockchain network.

20 Claims, 10 Drawing Sheets

(51) Int. Cl.
    *G06F 8/71*           (2018.01)
    *H04L 9/00*         (2022.01)

(56)           References Cited

U.S. PATENT DOCUMENTS

| | | | | | |
|---|---|---|---|---|---|
| 2019/0163912 | A1* | 5/2019 | Kumar | .................. | H04L 9/0877 |
| 2019/0229893 | A1* | 7/2019 | Nenov | ................ | G06F 9/44505 |
| 2019/0303623 | A1* | 10/2019 | Reddy | ........................ | G06F 8/71 |
| 2020/0051069 | A1* | 2/2020 | Wilson | ................ | G06F 16/1834 |
| 2020/0394085 | A1* | 12/2020 | Mercuri | ................... | H04L 67/51 |
| 2021/0124722 | A1* | 4/2021 | Srivastava | ............ | H04L 9/3236 |
| 2021/0174432 | A1* | 6/2021 | Gonnaud | ............. | G06Q 20/401 |
| 2023/0004542 | A1* | 1/2023 | Fu | ............................. | G06F 8/71 |

FOREIGN PATENT DOCUMENTS

| | | | |
|---|---|---|---|
| CN | 110544097 | A | 12/2019 |
| CN | 111273970 | A | 6/2020 |
| CN | 111311415 | A | 6/2020 |
| CN | 111581181 | A | 8/2020 |
| CN | 111813441 | A | 10/2020 |

OTHER PUBLICATIONS

The World Intellectual Property Organization (WIPO) International Search Report for PCT/CN2021/107240 Oct. 19, 2021 6 Pages (including translation).

* cited by examiner

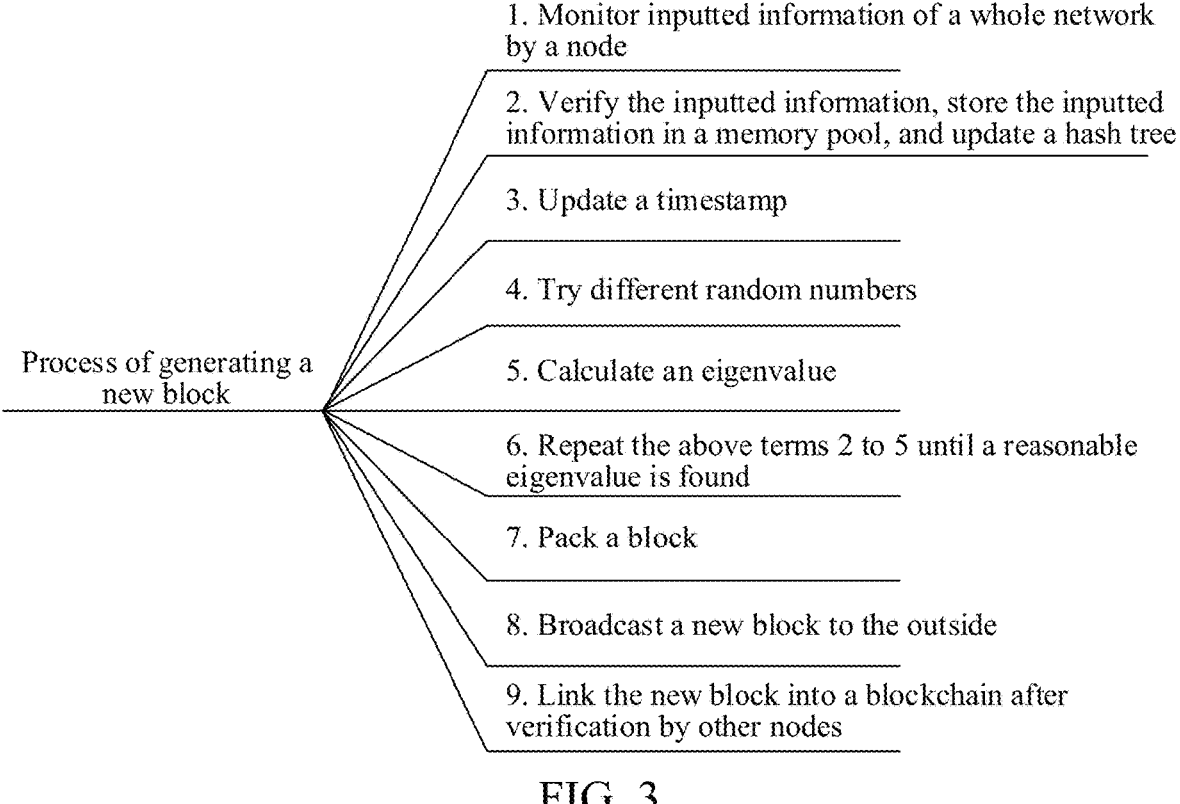

1. Monitor inputted information of a whole network by a node

2. Verify the inputted information, store the inputted information in a memory pool, and update a hash tree 3. Update a timestamp 4. Try different random numbers 5. Calculate an eigenvalue 6. Repeat the above terms 2 to 5 until a reasonable eigenvalue is found 7. Pack a block 8. Broadcast a new block to the outside 9. Link the new block into a blockchain after verification by other nodes Process of generating a new block

FIG. 3

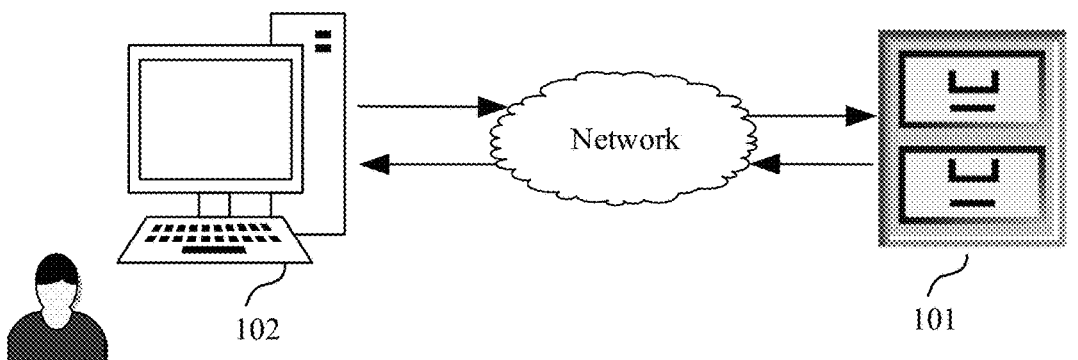

Network

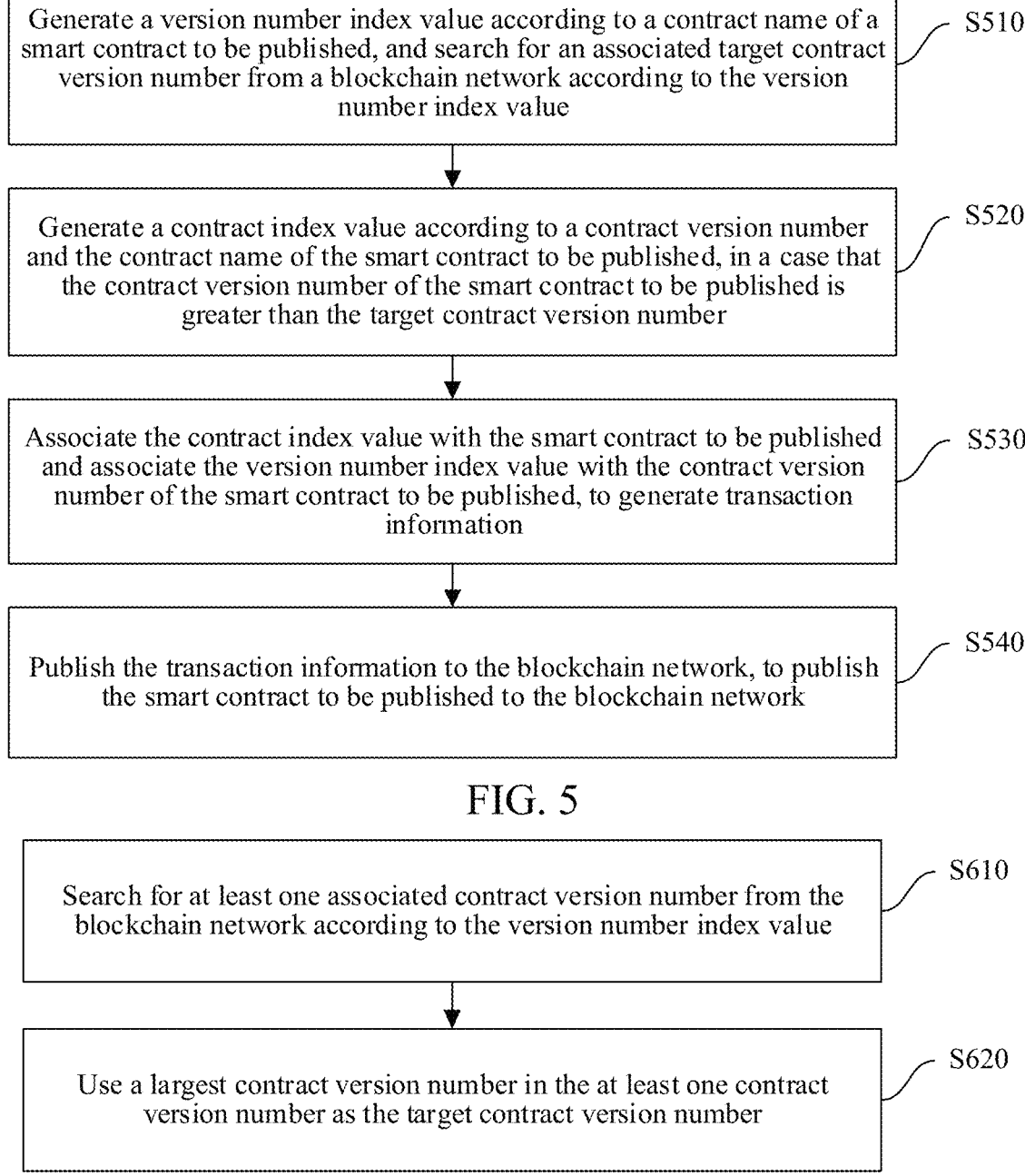

Generate a version number index value according to a contract name of a smart contract to be published, and search for an associated target contract version number from a blockchain network according to the version number index value    S510

Generate a contract index value according to a contract version number and the contract name of the smart contract to be published, in a case that the contract version number of the smart contract to be published is greater than the target contract version number    S520

Associate the contract index value with the smart contract to be published and associate the version number index value with the contract version number of the smart contract to be published, to generate transaction information    S530

Publish the transaction information to the blockchain network, to publish the smart contract to be published to the blockchain network    S540

FIG. 5

Search for at least one associated contract version number from the blockchain network according to the version number index value    S610

Use a largest contract version number in the at least one contract version number as the target contract version number    S620

FIG. 6

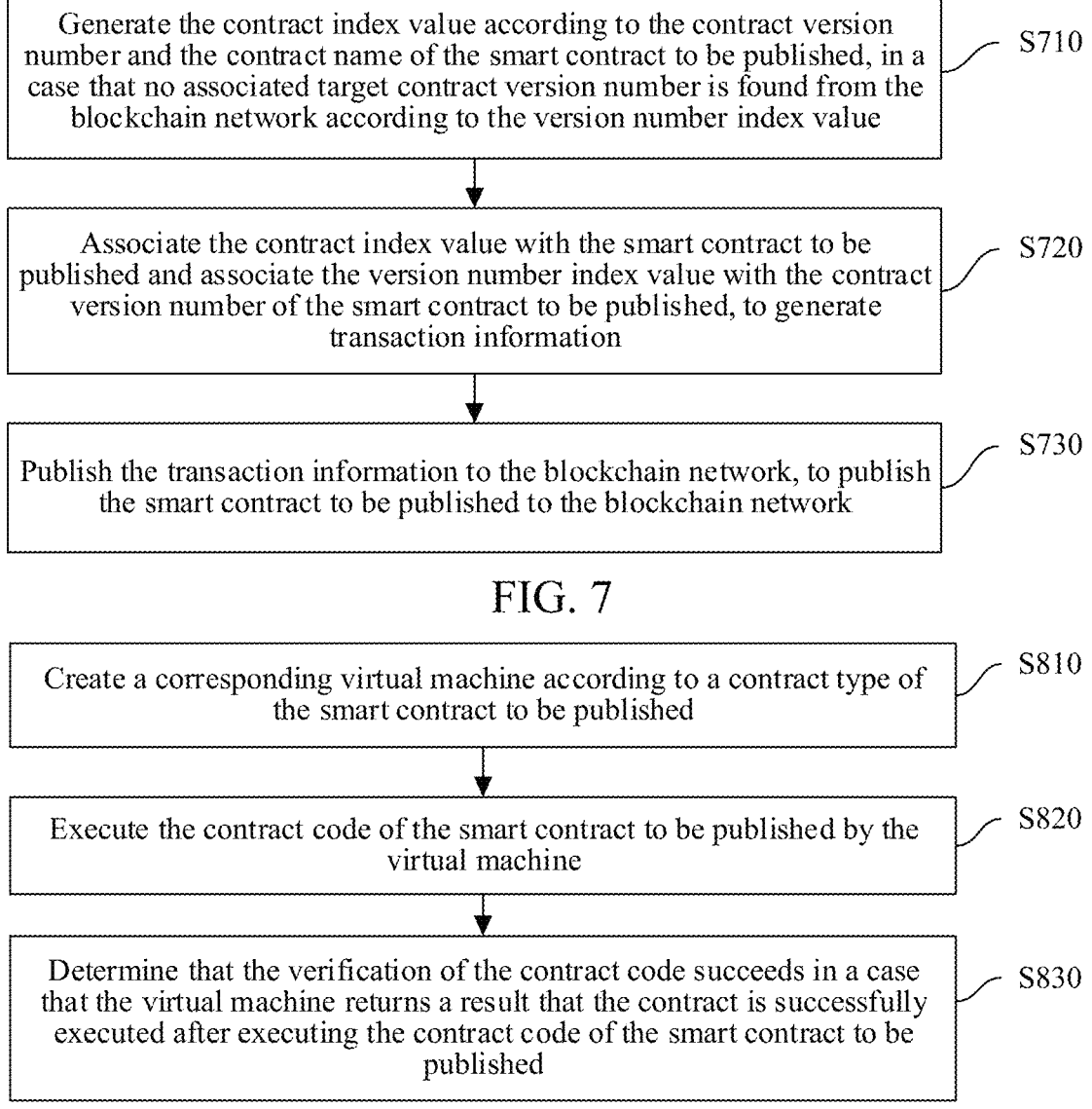

Generate the contract index value according to the contract version number and the contract name of the smart contract to be published, in a case that no associated target contract version number is found from the blockchain network according to the version number index value — S710

Associate the contract index value with the smart contract to be published and associate the version number index value with the contract version number of the smart contract to be published, to generate transaction information — S720

Publish the transaction information to the blockchain network, to publish the smart contract to be published to the blockchain network — S730

FIG. 7

Create a corresponding virtual machine according to a contract type of the smart contract to be published — S810

Execute the contract code of the smart contract to be published by the virtual machine — S820

Determine that the verification of the contract code succeeds in a case that the virtual machine returns a result that the contract is successfully executed after executing the contract code of the smart contract to be published — S830

FIG. 8

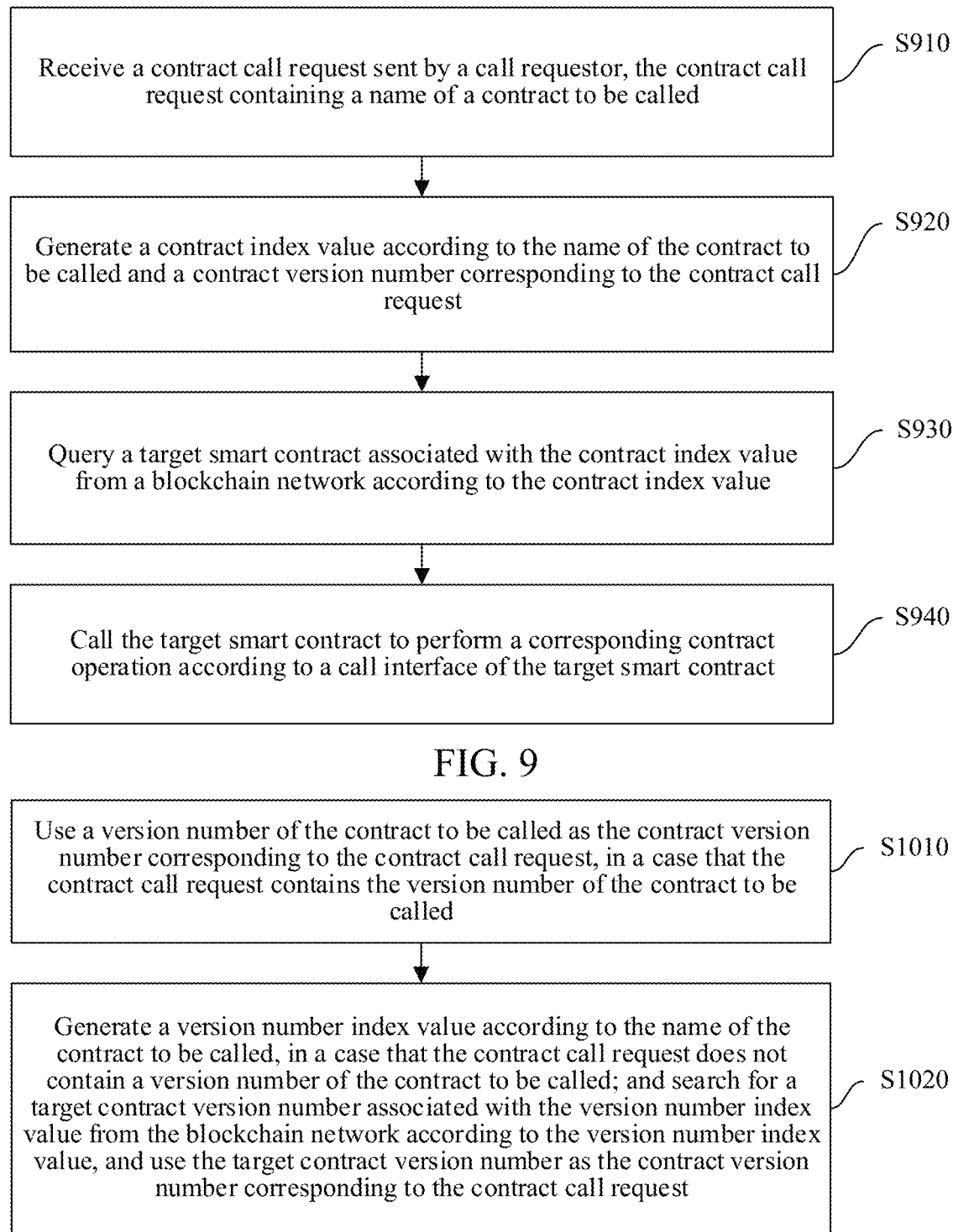

Receive a contract call request sent by a call requestor, the contract call request containing a name of a contract to be called — S910

Generate a contract index value according to the name of the contract to be called and a contract version number corresponding to the contract call request — S920

Query a target smart contract associated with the contract index value from a blockchain network according to the contract index value — S930

Call the target smart contract to perform a corresponding contract operation according to a call interface of the target smart contract — S940

FIG. 9

Use a version number of the contract to be called as the contract version number corresponding to the contract call request, in a case that the contract call request contains the version number of the contract to be called — S1010

Generate a version number index value according to the name of the contract to be called, in a case that the contract call request does not contain a version number of the contract to be called; and search for a target contract version number associated with the version number index value from the blockchain network according to the version number index value, and use the target contract version number as the contract version number corresponding to the contract call request — S1020

FIG. 10

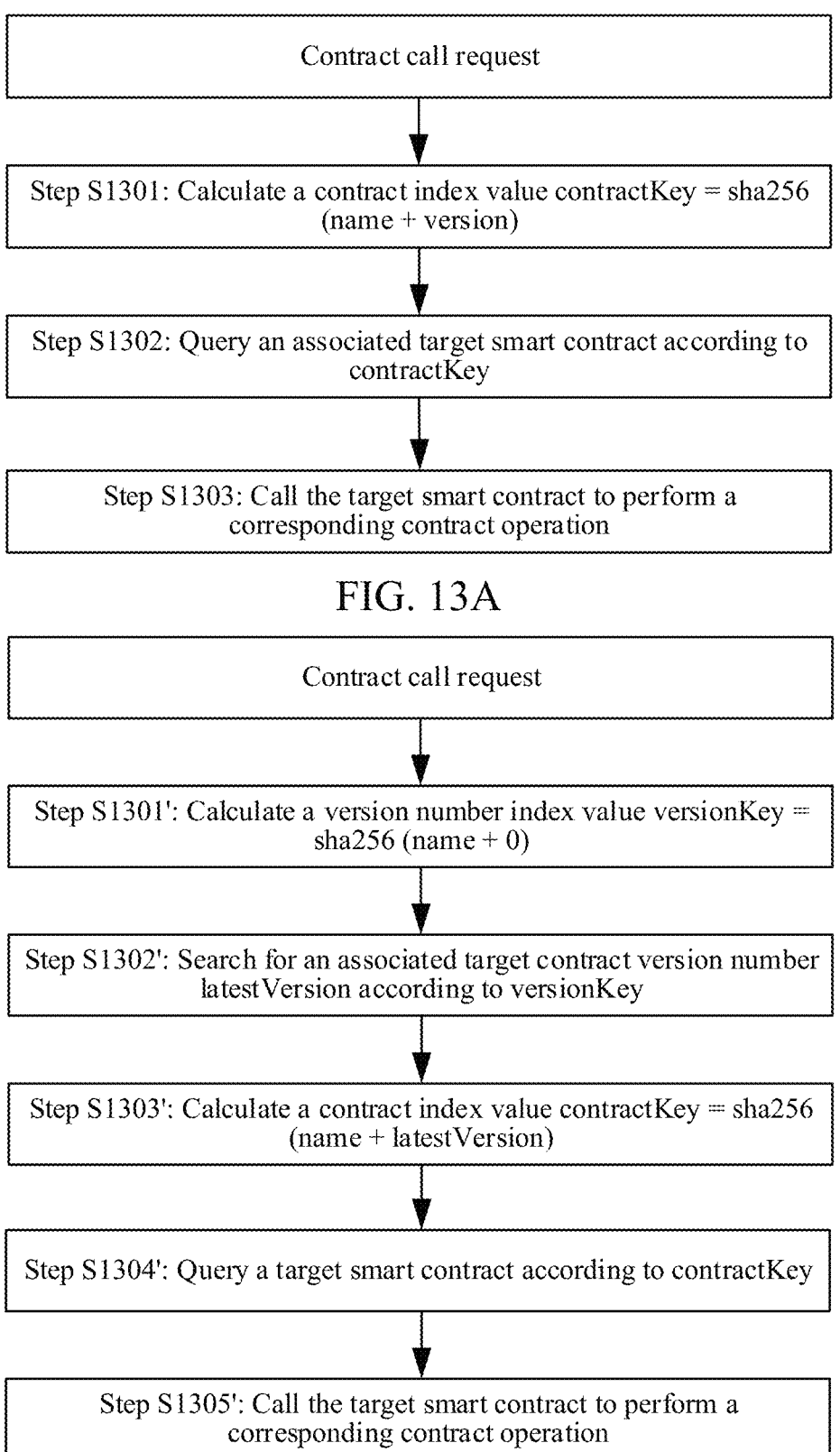

Contract call request

↓

Step S1301: Calculate a contract index value contractKey = sha256 (name + version)

↓

Step S1302: Query an associated target smart contract according to contractKey

↓

Step S1303: Call the target smart contract to perform a corresponding contract operation

FIG. 13A

Contract call request

↓

Step S1301': Calculate a version number index value versionKey = sha256 (name + 0)

↓

Step S1302': Search for an associated target contract version number latestVersion according to versionKey

↓

Step S1303': Calculate a contract index value contractKey = sha256 (name + latestVersion)

↓

Step S1304': Query a target smart contract according to contractKey

↓

Step S1305': Call the target smart contract to perform a corresponding contract operation

FIG. 13B

METHOD AND APPARATUS FOR PUBLISHING SMART CONTRACT, COMPUTER-READABLE MEDIUM, AND ELECTRONIC DEVICE

RELATED APPLICATION(S)

This application is a continuation application of PCT Patent Application No. PCT/CN2021/107240 filed on Jul. 20, 2021, which claims priority to Chinese Patent Application No. 2020109447660, entitled "METHOD AND APPARATUS FOR PUBLISHING SMART CONTRACT, COMPUTER-READABLE MEDIUM, AND ELECTRONIC DEVICE" and filed with the National Intellectual Property Administration, PRC on Sep. 10, 2020, all of which are incorporated herein by reference in entirety.

FIELD OF THE TECHNOLOGY

The present disclosure relates to the field of Internet technologies, and particularly, to a method and apparatus for publishing a smart contract, a computer-readable medium, and an electronic device.

BACKGROUND

A smart contract is executable code stored in a blockchain node, and the code specifies an execution process and processing logic of the smart contract, such as input, output, intermediate transition logic, and the like. To improve on the processing logic of the smart contract, it may be desirable to upgrade the smart contract in use.

SUMMARY

In one aspect, the present disclosure provides a method for publishing a smart contract, performed by a client, the method including: generating a version number index value according to a contract name of the smart contract, and searching for an associated target contract version number from a blockchain network according to the version number index value; generating a contract index value according to a contract version number of the smart contract and the contract name, when or in response to determining that the contract version number of the smart contract is greater than the target contract version number; associating the contract index value with the smart contract and associating the version number index value with the contract version number of the smart contract, to generate transaction information; and publishing the transaction information to the blockchain network, to publish the smart contract to the blockchain network.

In another aspect, the present disclosure provides a method for calling a smart contract, performed by a blockchain node, the method including: receiving a contract call request sent by a call requestor, the contract call request including a name of the smart contract; generating a contract index value according to the name of the smart contract and a contract version number corresponding to the contract call request; querying a target smart contract associated with the contract index value from published smart contracts in a blockchain network according to the contract index value; and calling the target smart contract to perform a corresponding contract operation according to a call interface of the target smart contract.

In yet another aspect, the present disclosure provides an apparatus for publishing a smart contract, the apparatus including: a memory storing computer program instructions; and a processor coupled to the memory and configured to execute the computer program instructions and perform: generating a version number index value according to a contract name of the smart contract, and searching for an associated target contract version number from a blockchain network according to the version number index value; generating a contract index value according to a contract version number of the smart contract and the contract name, in response to determining that the contract version number of the smart contract to be published is greater than the target contract version number; associating the contract index value with the smart contract and associating the version number index value with the contract version number of the smart contract, to generate transaction information; and publishing the transaction information to the blockchain network, to publish the smart contract to the blockchain network.

In yet another aspect, the present disclosure provides an apparatus for calling a smart contract, the apparatus including: a memory storing computer program instructions; and a processor coupled to the memory and configured to execute the computer program instructions and perform: receiving a contract call request sent by a call requestor, the contract call request including a name of the smart contract; generating a contract index value according to the name of the smart contract and a contract version number corresponding to the contract call request; querying a target smart contract associated with the contract index value from published smart contracts in a blockchain network according to the contract index value; and calling the target smart contract to perform a corresponding contract operation according to a call interface of the target smart contract.

In yet another aspect, the present disclosure provides a computer-readable medium, storing a computer-readable instruction. The computer-readable instruction, when executed by a processor, implements the method for publishing a smart contract or the method for calling a smart contract according to the above embodiments.

Details of one or more embodiments of the present disclosure are provided in the accompanying drawings and descriptions below. Other features, objectives, and advantages of the present disclosure become apparent from the present disclosure, the accompanying drawings, and claims.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

FIG. 3 is a schematic diagram of a new block generation in a blockchain;

FIG. 4 is a schematic diagram of a system architecture to which a technical solution is applied according to certain embodiment(s) of the present disclosure;

FIG. 5 is a schematic flowchart of a method for publishing a smart contract according to certain embodiment(s) of the present disclosure;

FIG. 6 is a schematic flowchart of a method for publishing a smart contract according to certain embodiment(s) of the present disclosure;

FIG. 7 is a schematic flowchart of a method for publishing a smart contract according to certain embodiment(s) of the present disclosure;

FIG. 8 is a schematic flowchart of a method for publishing a smart contract according to certain embodiment(s) of the present disclosure;

FIG. 9 is a schematic flowchart of a method for calling a smart contract according to certain embodiment(s) of the present disclosure;

FIG. 10 is a schematic flowchart of a method for calling a smart contract according to certain embodiment(s) of the present disclosure;

FIG. 13A is a schematic flowchart of a method for calling a smart contract according to certain embodiment(s) of the present disclosure;

FIG. 13B is a schematic flowchart of a method for calling a smart contract according to certain embodiment(s) of the present disclosure;

DETAILED DESCRIPTION

Figures 1, 2:
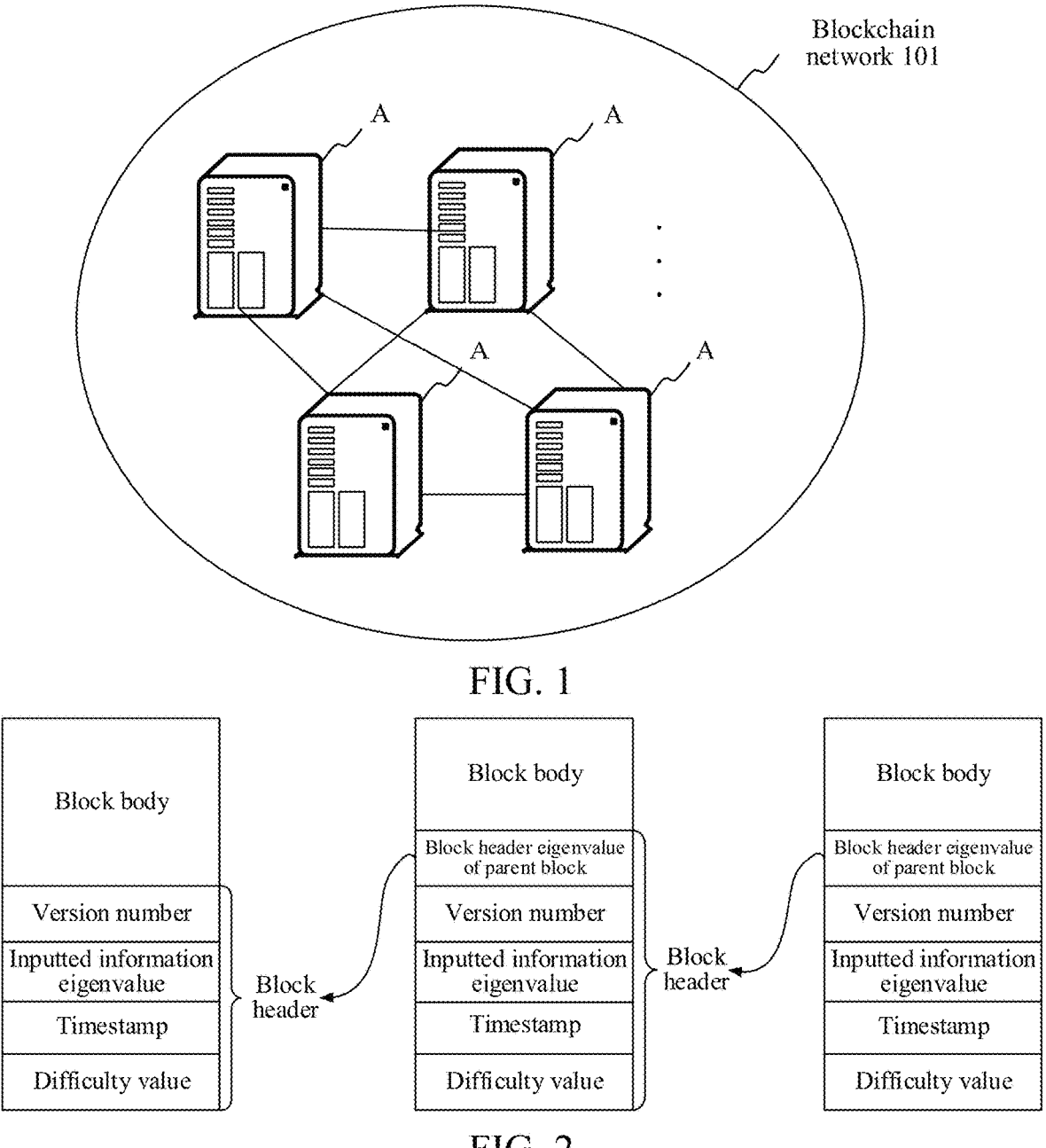
FIG. 1 is a schematic structural diagram of a blockchain network.
FIG. 2 is a schematic structural diagram of a blockchain.

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

When and as applicable, the term "an embodiment," "one embodiment," "some embodiment(s)," "some embodiments," "certain embodiment(s)," or "certain embodiments" may refer to one or more subsets of all possible embodiments. When and as applicable, the term "an embodiment," "one embodiment," "some embodiment(s)," "some embodiments," "certain embodiment(s)," or "certain embodiments" may refer to the same subset or different subsets of all the possible embodiments, and can be combined with each other without conflict.

In certain embodiments, the term "based on" is employed herein interchangeably with the term "according to."

In addition, the described features, structures, or characteristics may be combined in one or more embodiments in any appropriate manner. In the following descriptions, lots of specific details are provided to give a thorough understanding of the embodiments of the present disclosure. However, a person skilled in the art is to be aware that, the technical solutions in the present disclosure may be implemented without one or more of the specific details, or other methods, units, apparatuses, steps, or the like may be used. Well-known methods, apparatuses, implementations, or operations are not shown or described in detail, to avoid obscuring aspects of the present disclosure.

The terms used in the present disclosure, claims and the accompanying drawings of the present disclosure are merely used for illustrating embodiments, and are not intended to limit the scope of the present disclosure. It is to be understood that the terms such as "include", "comprise", and "contain", when used in the present disclosure, specify the presence of stated features, integers, steps, operations, elements, assemblies, and/or groups thereof, but do not preclude the presence or addition of one or more other features, integers, steps, operations, elements, assemblies, and/or groups thereof.

It is to be further understood that, although the terms such as "first", "second", and "third" may be used for describing various elements in the present disclosure, the elements are not to be limited by such terms. The terms are merely used for distinguishing one element from another element. For example, a first element may be referred to as a second element without departing from the scope of the present disclosure. Similarly, a second element may be referred to as a first element. As used in the present disclosure, the term "and/or" includes any or all combinations of one or more associated listed items.

The block diagrams shown in the accompany drawings are merely functional entities and do not necessarily correspond to physically independent entities. That is, the functional entities may be implemented in a software form, or in one or more hardware modules or integrated circuits, or in different networks and/or processor apparatuses and/or microcontroller apparatuses. The flowcharts shown in the accompanying drawings are merely examples for descriptions, do not need to include all content and operations/steps, and do not need to be performed in the described orders either. For example, some operations/steps may be further divided, while some operations/steps may be combined or partially combined. Therefore, an actual execution order may change according to an actual scenario.

It is to be understood that in the present disclosure, "at least one" means one or more, and "a plurality of" means two or more. Before the embodiments of the present disclosure are further described in detail, a description is made on nouns and terms in the embodiments of the present disclosure, and the nouns and terms in the embodiments of the present disclosure are applicable to the following explanations.

Smart contract: A computer protocol aimed at informatively propagating, verifying, or executing contracts, which allows credible transactions without a third party, where the transactions are traceable and irreversible, and the smart contract behaves as executable code in a blockchain environment.

sha256 (Secure Hash Algorithm): A secure hash algorithm with an arbitrary length input and a 256-bit output.

Blockchain network: A new application mode of computer technologies such as distributed data storage, point-to-point transmission, a consensus mechanism, and an encryption algorithm, which is essentially a decentralized database, and is a string of data blocks generated through association by using a cryptographic method, where each data block contains information used for verifying the validity of information of the data block (anti-counterfeiting) and generating a next data block.

FIG. 1 is a schematic structural diagram of a blockchain network. Referring to the blockchain network 101 shown in FIG. 1, the blockchain network 101 is a system for data sharing between nodes. Each node A may receive inputted information during normal working, and maintain shared data in the blockchain network 101 based on the received inputted information. To ensure information exchange in the blockchain network 101, there may be information connections among the nodes A in the blockchain network 101, and information transmission may be performed between the nodes A through the information connection. For example, when any node A in the blockchain network 101 receives inputted information, other nodes A in the blockchain network 101 obtain the inputted information according to a consensus algorithm, and store the inputted information as data in the shared data, so that data stored in all nodes A in the blockchain network 101 is consistent.

Each node A in the blockchain network 101 has a corresponding node identifier, and each node A in the blockchain network 101 may store node identifiers of the other nodes A in the blockchain network 101, to subsequently broadcast a generated block to the other nodes A in the blockchain network 101 according to the node identifiers of the other nodes A. Each node A may maintain a node identifier list shown in the following table, and node names and node identifiers are correspondingly stored in the node identifier list. The node identifier may be an Internet Protocol (IP) address and any other type of information capable of identifying the node. In Table 1, description is made by using only an IP address as an example.

TABLE 1

| Node name | Node identifier |
|-----------|-----------------|
| Node 1 | 117.114.151.174 |
| Node 2 | 117.116.189.145 |
| . . . | . . . |
| Node N | 119.123.789.258 |

Each node in the blockchain network 101 shown in FIG. 1 stores a same blockchain. The blockchain includes a plurality of blocks. Referring to FIG. 2, the blockchain includes a plurality of blocks, and a genesis block includes a block header and a block body. The block header stores an inputted information eigenvalue, a version number, a timestamp, and a difficulty value, and the block body stores inputted information. A next block of the genesis block uses the genesis block as a parent block, and the next block also includes a block header and a block body. The block header stores an inputted information eigenvalue of the current block, a block header eigenvalue of the parent block, a version number, a timestamp, and a difficulty value, and the rest is deduced by analogy, so that block data stored in each block in the blockchain is associated with block data stored in the parent block, thereby ensuring the security of the inputted information in the blocks.

When or in response to determining that blocks are generated in the blockchain, referring to FIG. 3, when a node in which the blockchain is located receives the inputted information, the inputted information is verified. After the verification is performed, the inputted information is stored in a memory pool, and a hash tree thereof used for recording the inputted information is updated. Then, an update timestamp is updated to a time when the inputted information is received, different random numbers are tried, and eigenvalue calculation is performed a plurality of times, so that the calculated eigenvalue may satisfy the following formula:

$$SHA256(SHA256(version+prev\_hash+merkle\_root+ntime+nbits+x))<TARGET$$

where SHA256 is an eigenvalue algorithm used for calculating an eigenvalue; version (a version number) is version information of a related block protocol in the blockchain; pre_hash is the block header eigenvalue of the parent block of the current block; merkle_root is the inputted information eigenvalue; ntime is the update time of the update timestamp; nbits is current difficulty, is a fixed value within a period of time, and is redetermined after the fixed period of time; x is a random number; and TARGET is an eigenvalue threshold, and the eigenvalue threshold may be determined and obtained according to nbits.

In this way, when a random number satisfying the above formula is obtained through calculation, information may be correspondingly stored, and a block header and a block body may be generated, to obtain the current block. Subsequently, the node in which the blockchain is located transmits, according to the node identifiers of the other nodes A in the blockchain network 101, the newly generated block to the other nodes A in the blockchain network 101 in which the node is located. The other nodes A verify the newly generated block and add the newly generated block to the blockchain stored therein after performing the verification.

FIG. 4 is a schematic diagram of an exemplary system architecture 100 to which a technical solution according to an embodiment of the present disclosure is applicable. As shown in FIG. 4, the system architecture 100 may include the blockchain network 101 and a client 102. The form and quantity of the client 102 are used for example, and do not constitute a limitation on the embodiments of the present disclosure. For example, two or more clients 102 may be included.

The client 102 may be any one of the following: a terminal, an independent application program, an application programming interface (API), or a software development kit (SDK). The terminal may include, but is not limited to, a smart phone (such as an Android mobile phone or an IOS mobile phone), a tablet computer, a portable personal computer, a mobile Internet device (MID), a server, and the like. The server may be an independent physical server, or may be a server cluster or a distributed system formed by a plurality of physical servers, or may be a cloud server that provides cloud computing services such as a cloud service, a cloud database, cloud computing, a cloud function, cloud storage, a network service, cloud communication, a middleware service, a domain name service, a security service, a content delivery network (CDN), big data, and an artificial intelligence platform.

In practical applications, one or more users can operate the client 102. This embodiment of the present disclosure uses an example in which one user operates one client. In an embodiment of the present disclosure, the user may input a smart contract to be published in the client 102. After the user confirms, the client 102 may generate a version number index value according to a contract name of the smart contract to be published, and search for an associated target contract version number from the blockchain network 101 according to the version number index value. When or in response to determining that a contract version number of the smart contract to be published is greater than the target contract version number, the client 102 may generate a contract index value according to the contract version number of the smart contract to be published and the contract name. Then, the client 102 may associate the contract index value with the smart contract to be published and associate the version number index value with the contract version number of the smart contract to be published, to generate transaction information. Finally, the client 102 may publish the transaction information to the blockchain network 101, to publish the smart contract to be published to the blockchain network.

Therefore, in a method for publishing a smart contract according to this embodiment of the present disclosure, a version number index value is generated according to a contract name of a smart contract to be published, and a contract index value is generated according to a contract version number of the smart contract to be published and the contract name. Then, the contract index value is associated with the smart contract to be published, and the version number index value is associated with the contract version number of the smart contract to be published, to generate transaction information. The transaction information is published to a blockchain network, to publish the smart contract to be published to the blockchain network. This embodiment of the present disclosure can implement a smart contract upgrade function at a blockchain platform level, which strengthens a capability of a blockchain platform, and does not need to develop a contract upgrade function, thereby saving development costs.

Implementation details of the technical solutions of the embodiments of the present disclosure are described below in detail.

FIG. 5 is a flowchart of a method for publishing a smart contract according to an embodiment of the present disclosure. The method for publishing a smart contract may be performed by a client. The client may be the client 102 shown in FIG. 4. Referring to FIG. 5, the method for publishing a smart contract includes the following steps:

Step S510: Generate a version number index value according to a contract name of a smart contract to be published, and search for an associated target contract version number from a blockchain network according to the version number index value.

Step S520: Generate a contract index value according to a contract version number of the smart contract to be published and the contract name, when or in response to determining that the contract version number of the smart contract to be published is greater than the target contract version number.

Step S530: Associate the contract index value with the smart contract to be published and associate the version number index value with the contract version number of the smart contract to be published, to generate transaction information.

Step S540: Publish the transaction information to the blockchain network, to publish the smart contract to be published to the blockchain network.

The steps are described below in detail. In Step S510, a version number index value is generated according to a contract name of a smart contract to be published, and an associated target contract version number is searched from a blockchain network according to the version number index value.

The smart contract is program code that runs on a blockchain and is capable of performing arbitrary computations and implementing complex logic. The program code of the smart contract may have functions of transmitting user account information and corresponding capital information, making mutual calls with other smart contracts, jointly maintaining the user account information and the corresponding capital information with other node devices of the blockchain platform, and the like.

The smart contract published on the blockchain is compiled by a compiler from source code of a smart contract written by a developer in a high-level programming language into bytecode of a smart contract executable on a virtual machine or a processor. The high-level programming language includes but is not limited to any one of the following: Solidity language, C++ language, GO language, Rust language, python language, javascript language, Java language, Hashell language, Ruby language, and the like. The compiler corresponds to the high-level programming language. If the high-level programming language is different, a type of the compiler used in the compilation is also different.

In this embodiment, an executing entity for the method for publishing a smart contract may obtain a smart contract to be published locally or from other devices. After the executing entity obtains the smart contract to be published, a version number index value may be generated according to a contract name of the smart contract to be published, and an associated target contract version number may be searched from a blockchain network according to the version number index value.

In certain embodiment(s), a mapping relationship between the version number index value and the contract version number may be recorded in the blockchain network. The version number index value may indicate a reading position of the contract version number. Through the reading position indicated by the version number index value, the associated target contract version number may be found.

In an embodiment, the blockchain network may store the mapping relationship between the version number index value and the contract version number in a Key-Value manner, where Key is the version number index value, and Value is the contract version number.

It may be understood that the target contract version number is the contract version number that is recorded in the blockchain network and has a mapping relationship with the version number index value of the smart contract to be published.

In some embodiments of the present disclosure, the manner of generating a version number index value may be to obtain a hash value by using a hash algorithm and use the hash value as the version number index value. In certain embodiment(s), the executing entity may perform a hash calculation on the contract name of the smart contract to be published to obtain a first hash value, and use the calculated first hash value as the version number index value.

In certain embodiment(s), the hash algorithm may adopt a sha256 hash function. sha256 produces a 256-bit hash value for messages of any length. For example, for a contract name of "100 days to become a blockchain programmer, uncle leads us, fighting!", a corresponding hash value of "A7FCFC6B5269BDCCE571798D618EA219A68B96CB 87A0E21080C2E758D23E4CE9" may be obtained by the hash function SHA256 calculation. In certain embodiment(s), in this embodiment, the version number index value may be expressed as versionKey, and the version number index value may be expressed as versionKey=sha256 (name+0), where name is the contract name of the smart contract to be published. '0' is merely exemplary and may be any other numerical value, such as '1', '2', or other arbitrary values.

Therefore, when the blockchain network stores the mapping relationship in the Key-Value manner, the executing entity may use versionKey as Key to obtain value from the blockchain network, and the obtained value is the associated target contract version number.

In other embodiments of the present disclosure, the contract name of the smart contract to be published may alternatively be used as the version number index value. In this embodiment, a mapping relationship between the contract name and the contract version number may be recorded in the blockchain network. Therefore, the associated target contract version number may be obtained through the contract name of the smart contract to be published.

In Step S520, when or in response to determining that a contract version number of the smart contract to be published is greater than the target contract version number, a contract index value is generated according to the contract version number of the smart contract to be published and the contract name.

A contract owner may publish a plurality of smart contracts with a same contract name but different contract version numbers. Except for the first publishing of a smart contract, subsequent publishing behaviors may be referred to as "upgrading contract".

However, whether it is the first publishing of the smart contract or subsequent publishing of the smart contract, the contract version numbers of the plurality of smart contracts are to be incremented in an order of publishing time. Therefore, to publish the smart contract to be published, the contract version number of the smart contract to be published is greater than the contract version number corresponding to a latest publishing time.

In this embodiment, because the mapping relationship between the version number index value and the contract version number may be recorded in the blockchain network, the associated target contract version number may be searched using the version number index value, that is, the contract version number corresponding to the latest publishing time may be searched.

Therefore, when or in response to determining that the contract version number of the smart contract to be published is greater than the target contract version number, the smart contract to be published may be published. During a specific implementation, to publish the smart contract to be published, a contract index value may be generated first according to the contract version number of the smart contract to be published and the contract name.

Conversely, when or in response to determining that the contract version number of the smart contract to be published is less than or equal to the target contract version number, publishing of the smart contract to be published to the blockchain network is terminated.

In an embodiment of the present disclosure, the manner of generating a contract index value may be to obtain a hash value by using a hash algorithm and use the hash value as the contract index value. In certain embodiment(s), the executing entity may perform a hash calculation on the contract name and the contract version number of the smart contract to be published to obtain a second hash value, and use the calculated second hash value as the version number index value. In certain embodiment(s), the hash algorithm may adopt the sha256 hash function, the contract index value may be expressed as contractKey, and the contract index value may be expressed as contractKey=sha256 (name+version), where name is the contract name of the smart contract to be published, and version is the contract version number of the smart contract to be published.

In Step S530, the contract index value is associated with the smart contract to be published, and the version number index value is associated with the contract version number of the smart contract to be published, to generate transaction information.

In order to publish the smart contract to be published to the blockchain network, after the contract index value is generated according to the contract version number of the smart contract to be published and the contract name, the contract index value may be further associated with the smart contract to be published, and the version number index value may be further associated with the contract version number of the smart contract to be published, to generate transaction information.

It is worth mentioning that the associating the contract index value with the smart contract to be published is establishing a mapping relationship between the contract index value and the smart contract to be published, and the associating the version number index value with the contract version number of the smart contract to be published is establishing a mapping relationship between the version number index value and the contract version number of the smart contract to be published. In this way, through establishing the two mapping relationships, subsequent search of the contract version number and search of the smart contract are greatly facilitated.

In Step S540, the transaction information is published to the blockchain network, to publish the smart contract to be published to the blockchain network.

After the transaction information is generated, the executing entity may publish the transaction information to the blockchain network through a publishing interface, to publish the smart contract to the blockchain network, so that node devices in the blockchain network may call the smart contract.

In the technical solutions of the embodiments, the version number index value is generated according to the contract name of the smart contract to be published, and the contract index value is generated according to the contract version number of the smart contract to be published and the contract name. Then, the contract index value is associated with the smart contract to be published, and the version number index value is associated with the contract version number of the smart contract to be published, to generate the transaction information. The transaction information is published to the blockchain network, to publish the smart contract to be published to the blockchain network. Compared with another proxy contract mode at a blockchain application level, this embodiment of the present disclosure can implement a smart contract upgrade function at a blockchain platform level, which strengthens a capability of a blockchain platform, and does not need to develop a contract upgrade function, thereby saving development costs. The contract owner may upgrade a contract, and then publish a plurality of smart contracts to the blockchain network. In addition, publishing in a manner of generating transaction information improves the security and query efficiency of the smart contract published on the blockchain.

In an embodiment of the present disclosure, the mapping relationship between the version number index value and the contract version number may be recorded in the blockchain network, and the mapping relationship may include the version number index value and the contract version number corresponding to each publishing time, or may include only the version number index value and the contract version number corresponding to the latest publishing time. Therefore, when or in response to determining that the mapping relationship between the version number index value and the contract version number corresponding to each publishing time is recorded in the blockchain network, as shown in FIG. 6, the manner of searching for an associated target contract version number from a blockchain network according to the version number index value may include steps S610 and S620, which are described in detail as follows:

S610: Search for at least one associated contract version number from the blockchain network according to the version number index value.

The contract owner may publish a plurality of smart contracts with a same contract name but different contract version numbers, that is, the mapping relationship between the version number index value and the contract version number corresponding to each publishing time may be recorded in the blockchain network. Therefore, at least one associated contract version number may be found when searching from the blockchain network according to the version number index value.

Step S620: Use a largest contract version number in the at least one contract version number as the target contract version number.

During a specific implementation, the found at least one associated contract version number is a contract version number corresponding to each publishing time. Because the contract version numbers of the plurality of smart contracts published by the contract owner are to be incremented according to the publishing time, a largest contract version number in the at least one contract version number may be used as the target contract version number, that is, the contract version number corresponding to the latest publishing time.

In an embodiment of the present disclosure, as shown in FIG. 7, the method for publishing a smart contract further includes steps S710 to S730, which are described as follows:

Step S710: Generate the contract index value according to the contract version number of the smart contract to be published and the contract name, when or in response to determining that no associated target contract version number is found from the blockchain network.

In this embodiment, if no associated target contract version number is found from the blockchain network, it indicates that the contract owner does not associate the contract index value with the smart contract to be published and associate the version number index value with the contract version number of the smart contract to be published, to generate transaction information, and publish the transaction information to the blockchain network. Conversely, it indicates that the smart contract to be published is a smart contract published to the blockchain network by the contract owner for the first time.

In addition, because the version number index value is generated according to the contract name of the smart contract to be published, and no associated target contract version number is found from the blockchain network according to the version number index value, it indicates that the contract name of the smart contract to be published that is published by the contract owner for the first time is available.

Therefore, when publishing a smart contract to be published for the first time, a contract index value may be generated first according to a contract version number and a contract name of the smart contract to be published. The manner of generating a contract index value may be to obtain a hash value by using a hash algorithm and use the hash value as the contract index value. In certain embodiment(s), the executing entity may perform a hash calculation on the contract name and the contract version number of the smart contract to be published to obtain a second hash value, and use the calculated second hash value as the version number index value. In certain embodiment(s), the hash algorithm may adopt the sha256 hash function, and the contract index value may be expressed as sha256 (name+version), where name is the contract name of the smart contract to be published, and version is the contract version number of the smart contract to be published.

Step S720: Associate the contract index value with the smart contract to be published and associate the version number index value with the contract version number of the smart contract to be published, to generate transaction information.

In order to publish the smart contract to be published to the blockchain network for the first time, after the contract index value is generated according to the contract version number of the smart contract to be published and the contract name, the contract index value and the smart contract to be published may be further associated and the version number index value and the contract version number of the smart contract to be published may be further associated, to generate transaction information.

Step S730: Publish the transaction information to the blockchain network, to publish the smart contract to be published to the blockchain network.

After the transaction information is generated, the executing entity may publish the transaction information to the blockchain network through a publishing interface, to publish the smart contract to the blockchain network, so that node devices in the blockchain network may call the smart contract.

In an embodiment of the present disclosure, before the publishing the transaction information to the blockchain network, the method for publishing a smart contract further includes: verifying contract code of the smart contract to be published. The publishing the transaction information to the blockchain network includes: publishing the transaction information to the blockchain network when or in response to determining that verification of the contract code of the smart contract to be published succeeds.

In this embodiment, the contract code is formed by directly writing terms of protocols to be executed into a code line by the user, and the contract code is expressed in a form of bytes. Different execution protocols form different contract code, and different contract code may realize different service logic.

Therefore, in order to ensure that the contract code of the smart contract published to the blockchain network can implement corresponding service logic, the contract code of the smart contract to be published may be verified before publishing the transaction information to the blockchain network. If the verification of the contract code of the smart contract to be published succeeds, the transaction information may be published to the blockchain network.

In an embodiment of the present disclosure, as shown in FIG. 8, the process of verifying the contract code includes steps S810 to S830, which are described as follows:

Step S810: Create a corresponding virtual machine according to a contract type of the smart contract to be published.

In certain embodiment(s), the virtual machine is a computer system that is simulated through software, has a hardware system function, and runs in an isolated environment. The virtual machine may be a virtualized physical machine VMware, Java virtual machine, or the like. A blockchain virtual machine is a code running environment established on a blockchain system, and a main function of the blockchain virtual machine is to process smart contracts in the blockchain system.

In this embodiment, in order to verify the contract code, a code running environment may be created first, that is, a corresponding virtual machine may be created first according to a contract type of the smart contract to be published. The contract type refers to a contract programming language, which may be, for example, a C++ programming language, a java programming language, a solidity programming language, a python programming language, or the like.

Therefore, according to the contract type, the created corresponding virtual machine may include: a GNU compiler collection (GCC) virtual machine for executing smart contracts written in the C++ programming language, a java virtual machine (JVM) for executing smart contracts written in the java programming language; an ethereum virtual machine (EVM) for executing smart contracts written in the solidity programming language, or a python virtual machine (PVM) for executing smart contracts written in the python programming language.

Step S820: Execute the contract code of the smart contract to be published by the virtual machine.

Step S830: Determine that the verification of the contract code succeeds when or in response to determining that the virtual machine returns a result that the contract is successfully executed after executing the contract code of the smart contract to be published.

After the corresponding virtual machine is created, the contract code of the smart contract to be published may be executed by the virtual machine. If the virtual machine returns a result that the contract is successfully executed after executing the contract code of the smart contract to be published, it is determined that the verification of the contract code succeeds, that is, the code logic of the contract code can be executed in the virtual machine and parameters can be outputted. Conversely, if the code logic of the contract code cannot be executed in the virtual machine and the parameters cannot be outputted, it is determined that the verification of the contract code fails.

In an embodiment of the present disclosure, before the publishing the transaction information to the blockchain network, the method for publishing a smart contract further includes: obtaining owner information of a smart contract corresponding to the target contract version number; and performing the process of publishing the transaction information to the blockchain network when or in response to determining that the owner information matches publisher information of the smart contract to be published.

In this embodiment, a publisher of the smart contract to be published may publish a plurality of smart contracts. For the publishing of each smart contract, it is desirable to ensure that the found target contract version number is the latest publishing time corresponding to the publisher of the smart contract to be published. Therefore, before publishing the transaction information to the blockchain network, if the obtained owner information of the smart contract corresponding to the target contract version number does not match the publisher information, the process of publishing the transaction information to the blockchain network cannot be performed.

Conversely, if the owner information matches the publisher information of the smart contract to be published, the process of publishing the transaction information to the blockchain network can be performed.

The meaning of matching may be that the owner information is exactly the same as the publisher information of the smart contract to be published. Because the contract owner may transfer ownership, the meaning of matching may further include that the owner information and the publisher information of the smart contract to be published has a relationship between the transferor and the transferee.

FIG. 9 is a flowchart of a method for calling a smart contract according to an embodiment of the present disclosure. The method for calling a smart contract may be performed by any blockchain node in a blockchain network, and the blockchain node may be any blockchain node in the blockchain network 101 shown in FIG. 4 or FIG. 1. Referring to FIG. 9, the method for calling a smart contract includes steps S910 to S940, which are described in detail as follows:

Step S910: Receive a contract call request sent by a call requestor, the contract call request containing a name of a contract to be called.

In the blockchain network, by submitting a corresponding blockchain transaction to the blockchain node, a corresponding smart contract may be triggered by the blockchain transaction, and complex functions may be implemented by calling the smart contract. The smart contract is executable code deployed on the blockchain. The smart contract allows credible transactions to be performed without a third party, and the transactions are traceable and irreversible. One or more interfaces may be defined in a smart contract, and each interface is used to implement a corresponding function. When a smart contract is called through a blockchain transaction, which interface or interfaces defined in the smart contract are called may be declared to implement the corresponding function.

In certain embodiment(s), in this embodiment, the call requestor may be a client, and the client may send a contract call request to the blockchain network. The contract call request is used to request to call a certain interface in the target smart contract, and the contract call request may contain the name of the contract to be called.

It may be understood that there may be a plurality of smart contracts in the blockchain network, and the contract call request sent by the client may be for the target smart contract. The target smart contract may be a smart contract that the user is to call to handle an actual service and is published in the blockchain network. For example, the target smart contract may be a smart contract signed by the user with an insurance institution after purchasing insurance from the insurance institution, or a smart contract signed by the user with a factory after purchasing equipment in the factory. The target smart contract may include a plurality of interfaces, such as an interface A, an interface B, and an interface C, where each interface is used to implement a corresponding function.

Step S920: Generate a contract index value according to the name of the contract to be called and a contract version number corresponding to the contract call request.

In order to obtain the target smart contract for the contract call request, during a specific implementation, after receiving the contract call request, the blockchain network may first perform a hash calculation on the name of the contract to be called and a contract version number corresponding to the contract call request to obtain a hash value, and use the calculated hash value as the contract index value.

In certain embodiment(s), the hash algorithm may adopt the sha256 hash function, and the contract index value may be expressed as contractkey=sha56 (name+version), where name is the contract name of the smart contract to be published, and version is the contract version number of the smart contract to be published.

Step S930: Query a target smart contract associated with the contract index value from a blockchain network according to the contract index value.

After the contract index value is obtained, a target smart contract associated with the contract index value is further queried from a blockchain network according to the contract index value.

It may be understood that, because when the smart contract is published to the blockchain network, first, the contract index value is associated with the smart contract to be published, and the version number index value is associated with the contract version number of the smart contract to be published, to generate the transaction information; and then the transaction information is published to the blockchain network, to publish the smart contract to the blockchain network, a mapping relationship between the contract index value and the smart contract may be recorded in the blockchain network, and in this way, after the contract index value is generated, the target smart contract associated with the contract index value may be queried from the blockchain network according to the contract index value.

Step S940: Call the target smart contract to perform a corresponding contract operation according to a call interface of the target smart contract.

After the target smart contract is found through step S930, the blockchain network may parse the target smart contract and obtain a call interface of the target smart contract. Then, a corresponding preset function is implemented by calling the target interface.

In an embodiment of the present disclosure, the step of calling the target smart contract to perform a corresponding contract operation according to a call interface of the target smart contract includes: executing, through the call interface of the target smart contract, target contract code corresponding to the call interface in the target smart contract, to perform a contract operation corresponding to the contract call request.

In certain embodiment(s), the blockchain node in the blockchain network may run, through the call interface of the target smart contract, target contract code corresponding to the call interface in the target smart contract, to perform a contract operation corresponding to the contract call request, so that the blockchain node implements corresponding service logic and performs the service processing.

According to an embodiment of the present disclosure, as shown in FIG. 10, the method for calling a smart contract further includes the following steps:

Step S1010: Use a version number of the contract to be called as the contract version number corresponding to the contract call request, when or in response to determining that the contract call request contains the version number of the contract to be called.

Step S1020: Generate a version number index value according to the name of the contract to be called, when or in response to determining that the contract call request does not contain a version number of the contract to be called; and search for a target contract version number associated with the version number index value from the blockchain network according to the version number index value, and use the target contract version number as the contract version number corresponding to the contract call request.

In this embodiment, different contract version numbers corresponding to the contract call request may be determined according to whether the contract call request contains the version number of the contract to be called.

If the contract call request contains the version number of the contract to be called, the version number of the contract to be called may be directly used as the contract version number corresponding to the contract call request.

Conversely, if the contract call request does not contain the version number of the contract to be called, the version number index value may be generated first according to the name of the contract to be called, and then the target contract version number associated with the version number index value may be searched from the blockchain network according to the version number index value, and the target contract version number may be used as the contract version number corresponding to the contract call request.

In certain embodiment(s), a hash calculation may be performed on the version number of the contract to be called to obtain a hash value, and the calculated hash value may be used as the version number index value, or the name of the contract to be called may be directly used as the version number index value.

After the version number index value is obtained, the target contract version number associated with the version number index value may be searched from the blockchain network according to the version number index value. It may be understood that a mapping relationship between the version number index value and the contract version number may be recorded in the blockchain network. Therefore, the associated target contract version number may be found according to the version number index value.

Figure 11:
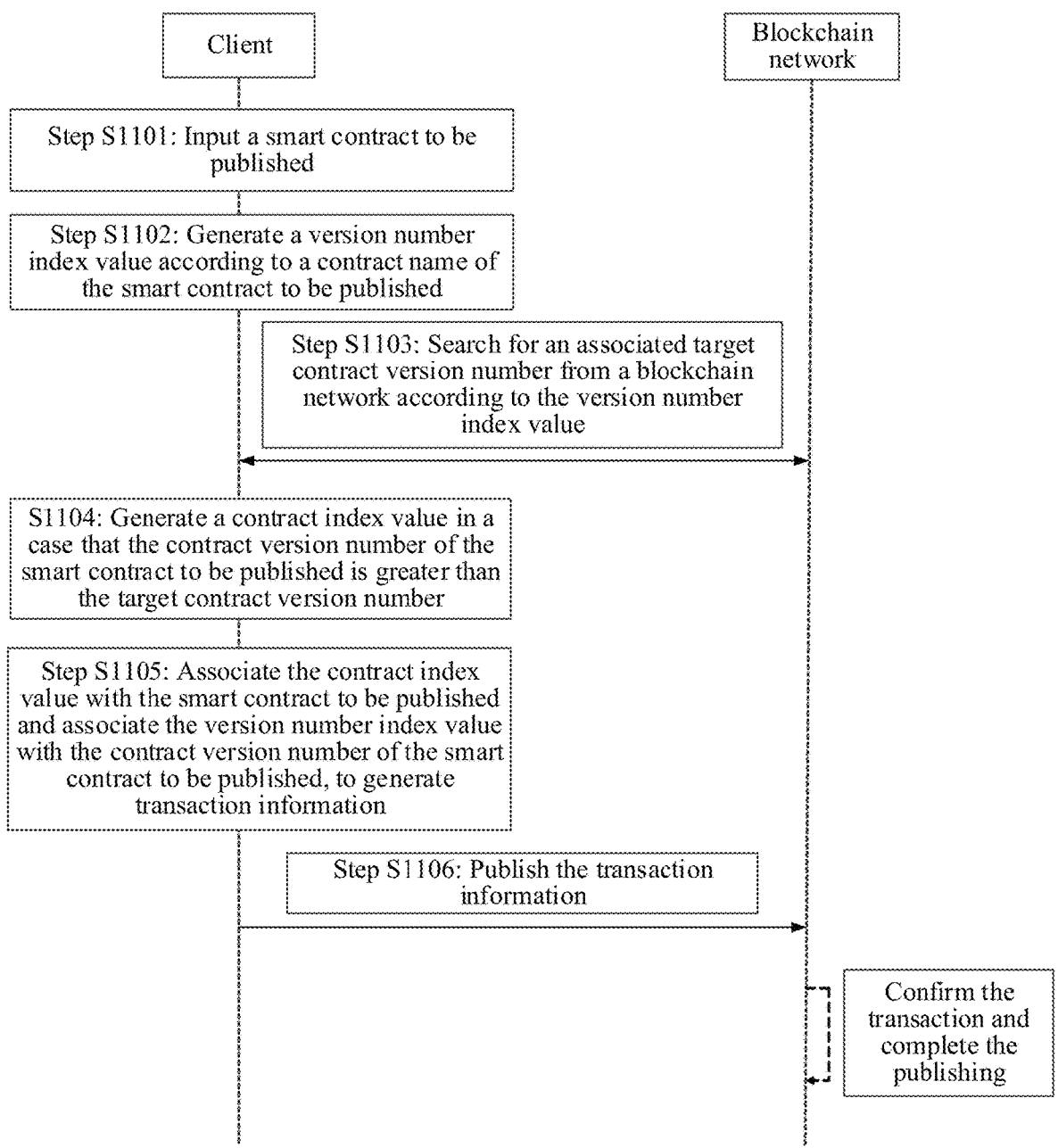
FIG. 11 is a schematic interaction flowchart of a method for publishing a smart contract according to certain embodiment(s) of the present disclosure.

FIG. 11 is an interaction flowchart of a method for publishing a smart contract according to an embodiment of the present disclosure. As shown in FIG. 11, the method for publishing a smart contract includes the following steps.

Step S1101: Input a smart contract to be published.

The user may input a smart contract to be published in a client, and the user may input information such as a contract name, a contract version number, a contract type, contract code, and a contract owner.

Step S1102: Generate, by the client, a version number index value according to a contract name of the smart contract to be published.

Step S1103: Search, by the client, for an associated target contract version number from a blockchain network according to the version number index value.

Step S1104: Generate a contract index value according to a contract version number of the smart contract to be published and the contract name of the smart contract to be published, when or in response to determining that the contract version number of the smart contract to be published is greater than the target contract version number.

Step S1105: Associate the contract index value with the smart contract to be published and associate the version number index value with the contract version number of the smart contract to be published, to generate transaction information.

Step S1106: Publish the transaction information to the blockchain network, to publish the smart contract to be published to the blockchain network.

Figure 12:
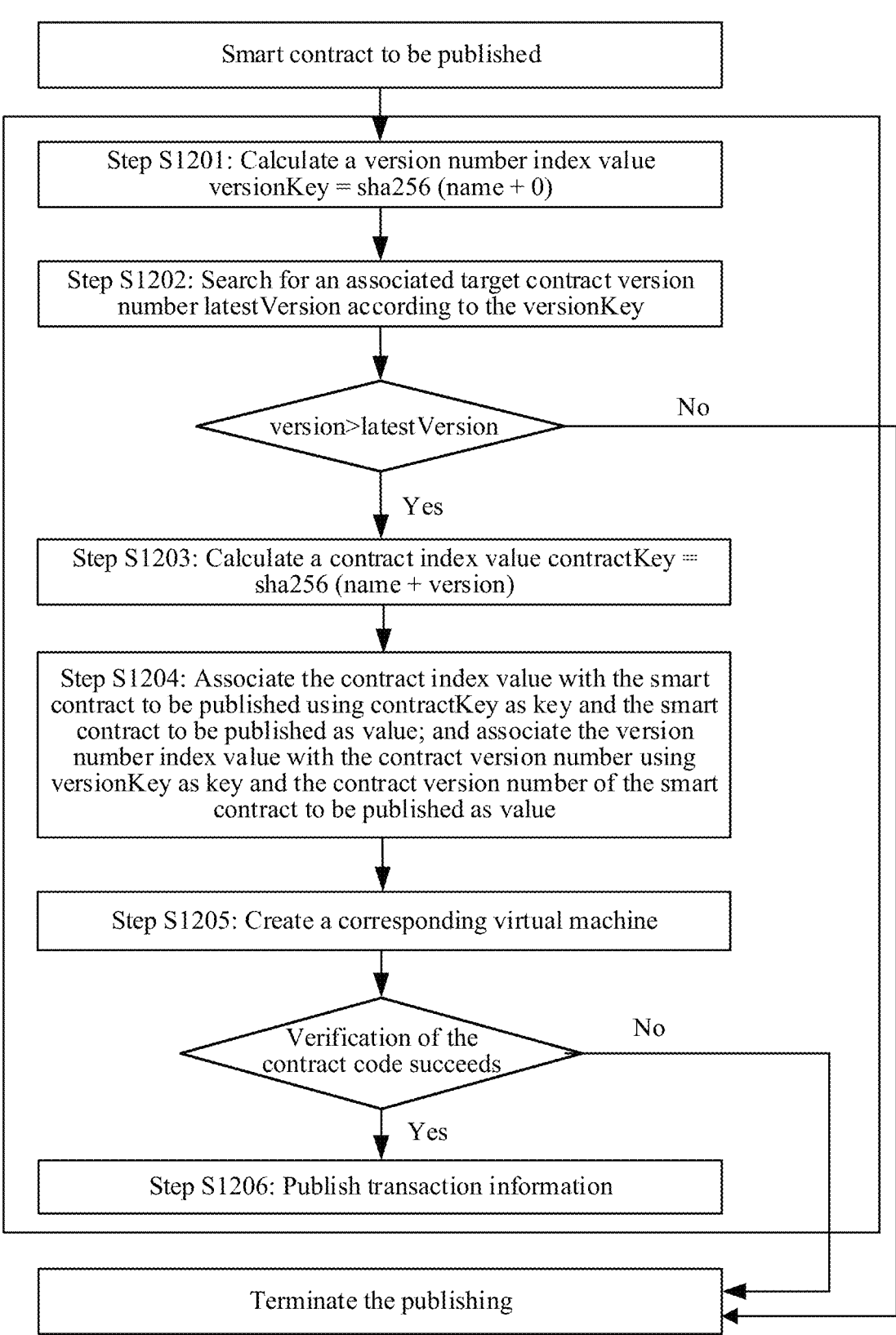
FIG. 12 is a schematic flowchart of a method for publishing a smart contract according to certain embodiment(s) of the present disclosure.

FIG. 12 is a flowchart of a method for publishing a smart contract according to an embodiment of the present disclosure. As shown in FIG. 12, the method for publishing a smart contract includes the following steps.

Step S1201: Calculate a contract name of a smart contract to be published using a sha256 hash function, to obtain a version number index value versionKey, which may be expressed as versionKey=sha256 (name+0), where name is the contract name of the smart contract to be published.

Step S1202: Search for an associated target contract version number latestVersion from a blockchain network according to the versionKey, and perform step S1203 if version of the smart contract to be published is greater than latestVersion; otherwise, terminate the publishing.

Step S1203: Calculate the contract name of the smart contract to be published and the contract version number of the smart contract to be published using a sha256 hash function, to obtain a contract index value contractKey, which may be expressed as contractKey=sha256 (name+version), where name is the contract name of the smart contract to be published, and version is the contract version number of the smart contract to be published.

Step S1204: Associate the contract index value with the smart contract to be published using contractKey as key and the smart contract to be published as value; and associate the version number index value with the contract version number of the smart contract to be published using versionKey as key and the contract version number of the smart contract to be published as value.

Step S1205: Create a corresponding virtual machine according to a contract type of the smart contract to be published, and determine that the verification of the contract code succeeds when or in response to determining that the virtual machine returns a result of that the contract is successfully executed after executing the contract code of the smart contract to be published, and perform a sixth step, otherwise, terminate publishing.

Step S1206: Publish transaction information, to publish the smart contract to be published to the blockchain network.

FIG. 13A is a flowchart of a method for calling a smart contract according to an embodiment of the present disclosure. As shown in FIG. 13A, when or in response to determining that a contract call request contains a version number of the contract to be called, the method for calling a smart contract may include:

Step S1301: Calculate, after receiving the contract call request, a name of a contract to be called and a version number of the contract to be called contained in the contract call request using a sha256 hash function to obtain a contract index value contractKey, which may be expressed as contractKey=sha256 (name+version), when or in response to determining that the contract call request contains the version number of the contract to be called, where name is the name of the contract to be called, and version is the version number of the contract to be called.

Step S1302: Query a target smart contract associated with the contract index value from a blockchain network according to the contract index value.

Step S1303: Call the target smart contract to perform a corresponding contract operation according to a call interface of the target smart contract.

FIG. 13B is a flowchart of a method for calling a smart contract according to another embodiment of the present disclosure. As shown in FIG. 13B, when or in response to determining that the contract call request does not contain a version number of the contract to be called, the method for calling a smart contract may include:

Step S1301': Calculate, after receiving the contract call request, a name of a contract to be called contained in the contract call request using a sha256 hash function to obtain a version number index value versionKey, which may be expressed as versionKey=sha256 (name+0), when or in response to determining that the contract call request does not contains the version number of the contract to be called, where name is the name of the contract to be called.

Step S1302': Search for a target contract version number latestVersion associated with the version number index value versionKey from a blockchain network according to the version number index value.

Step S1303': Calculate the name of the contract to be called contained in the contract call request and the target contract version number latestVersion using the sha256 hash function, to obtain a contract index value contractKey, which may be expressed as contractKey=sha256 (name+latestVersion), where name is the name of the contract to be called, and latestVersion is the target contract version number.

Step S1304': Query a target smart contract associated with the contract index value from the blockchain network according to the contract index value.

Step S1305': Call the target smart contract to perform a corresponding contract operation according to a call interface of the target smart contract.

This embodiment of the present disclosure can implement a smart contract upgrade function at a blockchain platform level, which strengthens a capability of a blockchain platform, and does not develop a contract upgrade function, thereby saving development costs. The contract owner may perform contract upgrade, and then publish the plurality of smart contracts to the blockchain network. Meanwhile, publishing in a manner of generating transaction information improves the security and query efficiency of the smart contract published on the blockchain.

The following describes apparatus embodiments of the present disclosure, which may be used for performing the method for publishing a smart contract in the embodiments of the present disclosure. For details not disclosed in the apparatus embodiments of the present disclosure, reference may be made to the embodiments of the method for publishing a smart contract of the present disclosure.

Figure 14:
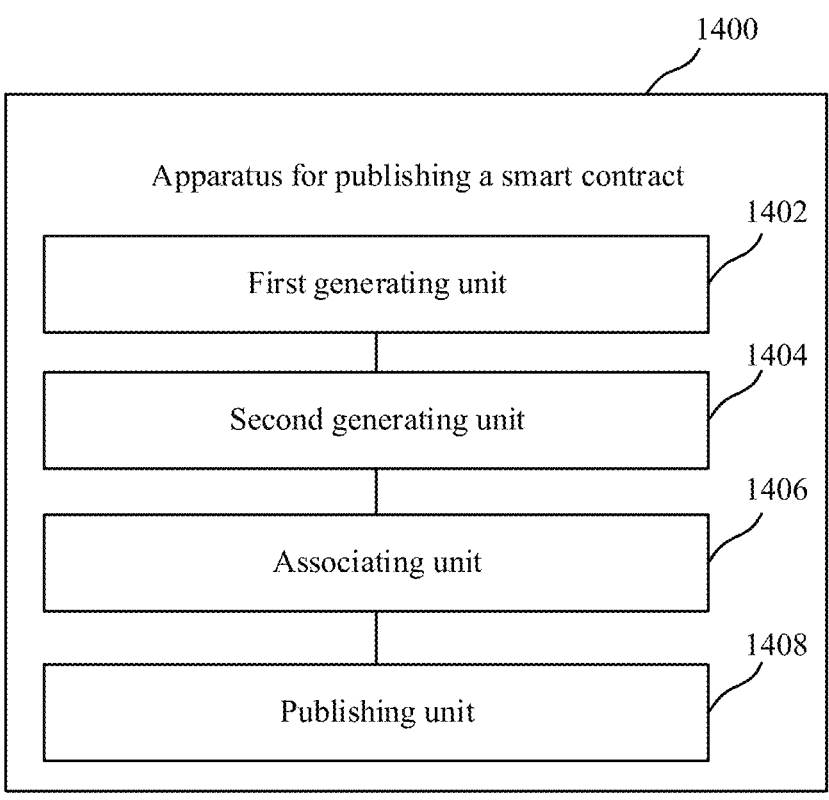
FIG. 14 is a schematic block diagram of an apparatus for publishing a smart contract according to certain embodiment (s) of the present disclosure.

FIG. 14 is a block diagram of an apparatus for publishing a smart contract according to an embodiment of the present disclosure. Referring to FIG. 14, the apparatus 1400 for publishing a smart contract according to an embodiment of the present disclosure includes: a first generating unit 1402, a second generating unit 1404, an associating unit 1406, and a first publishing unit 1408.

The first generating unit 1402 is configured to generate a version number index value according to a contract name of a smart contract to be published, and search for an associated target contract version number from a blockchain network according to the version number index value. The second generating unit 1404 is configured to generate a contract index value according to a contract version number of the smart contract to be published and the contract name, when or in response to determining that the contract version number of the smart contract to be published is greater than the target contract version number. The associating unit 1406 is configured to associate the contract index value with the smart contract to be published and associate the version number index value with the contract version number of the smart contract to be published, to generate transaction information. The first publishing unit 1408 is configured to publish the transaction information to the blockchain network, to publish the smart contract to be published to the blockchain network.

In some embodiments of the present disclosure, the first generating unit 1402 is configured to: perform a hash calculation according to the contract name of the smart contract to be published to obtain a first hash value, and use the calculated first hash value as the version number index value.

In some embodiments of the present disclosure, the second generating unit 1404 is configured to: perform a hash calculation according to the contract version number of the smart contract to be published and the contract name to obtain a second hash value, and use the calculated second hash value as the contract index value.

In some embodiments of the present disclosure, the first generating unit 1402 is configured to: search for at least one associated contract version number from the blockchain network according to the version number index value; and use a largest contract version number in the at least one contract version number as the target contract version number.

In some embodiments of the present disclosure, the apparatus for publishing a smart contract further includes: a third generating unit, configured to generate the contract index value according to the contract version number of the smart contract to be published and the contract name, when or in response to determining that no associated target contract version number is found from the blockchain network according to the version number index value; a fourth generating unit, configured to associate the contract index value with the smart contract to be published and associate the version number index value with the contract version number of the smart contract to be published, to generate transaction information; and a second publishing unit, configured to publish the transaction information to the blockchain network, to publish the smart contract to be published to the blockchain network.

In some embodiments of the present disclosure, the apparatus for publishing a smart contract further includes: a terminating unit, configured to terminate publishing of the smart contract to be published to the blockchain network, when or in response to determining that the contract version number of the smart contract to be published is less than or equal to the target contract version number.

In some embodiments of the present disclosure, before the publishing the transaction information to the blockchain network, the apparatus for publishing a smart contract further includes: a verifying unit, configured to verify contract code of the smart contract to be published; and the first publishing unit, configured to publish the transaction information to the blockchain network when or in response to determining that verification of the contract code of the smart contract to be published succeeds.

In some embodiments of the present disclosure, the verifying unit is configured to: create a corresponding virtual machine according to a contract type of the smart contract to be published; execute the contract code of the smart contract to be published by the virtual machine; and determine that the verification of the contract code succeeds when or in response to determining that the virtual machine returns a result that the contract is successfully executed after executing the contract code of the smart contract to be published.

In some embodiments of the present disclosure, before the publishing the transaction information to the blockchain network, the apparatus for publishing a smart contract further includes: an obtaining unit, configured to obtain owner information of a smart contract corresponding to the target contract version number; and an execution unit, configured to perform the process of publishing the transaction information to the blockchain network when or in response to determining that the owner information matches publisher information of the smart contract to be published.

Figure 15:
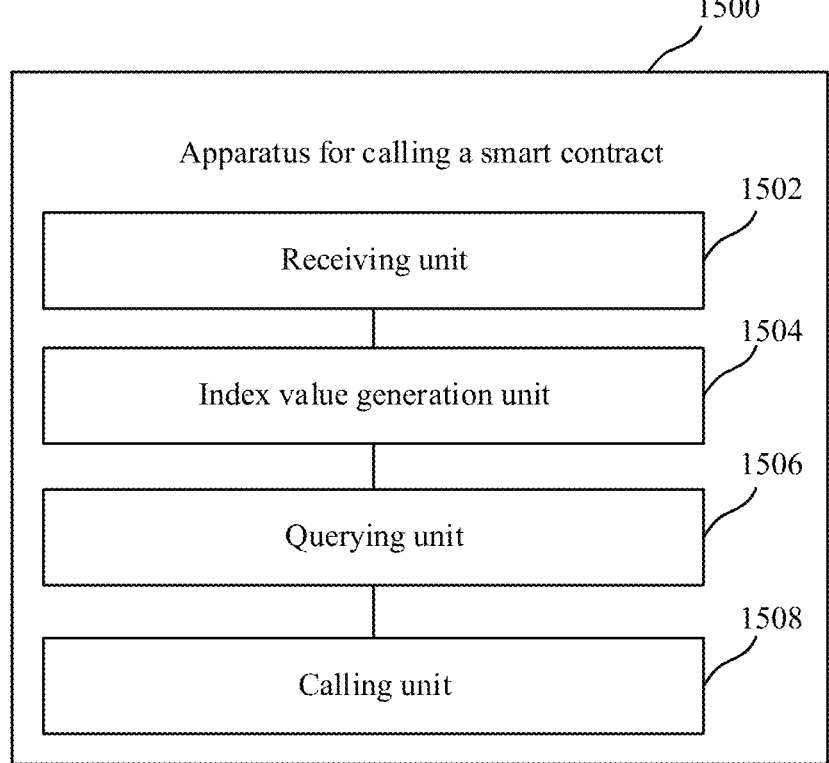
FIG. 15 is a schematic block diagram of an apparatus for calling a smart contract according to certain embodiment(s) of the present disclosure.

FIG. 15 is a block diagram of an apparatus for calling a smart contract according to an embodiment of the present disclosure.

Referring to FIG. 15, the apparatus 1500 for calling a smart contract according to an embodiment of the present disclosure includes: a receiving unit 1502, an index value generation unit 1504, a querying unit 1506, and a calling unit 1508.

The receiving unit 1502 is configured to receive a contract call request sent by a call requestor, the contract call request containing a name of a contract to be called. The index value generation unit 1504 is configured to generate a contract index value according to the name of the contract to be called and a contract version number corresponding to the contract call request. The querying unit 1506 is configured to query a target smart contract associated with the contract index value from published smart contracts in a blockchain network according to the contract index value. The calling unit 1508 is configured to call the target smart contract to perform a corresponding contract operation according to a call interface of the target smart contract.

In some embodiments of the present disclosure, the apparatus for calling a smart contract further includes a processing unit, configured to use a version number of the contract to be called as the contract version number corresponding to the contract call request, when or in response to determining that the contract call request contains the version number of the contract to be called.

In some embodiments of the present disclosure, the apparatus for calling a smart contract further includes a generating and searching unit, configured to generate a version number index value according to the name of the contract to be called, when or in response to determining that the contract call request does not contain a version number of the contract to be called; and search for a target contract version number associated with the version number index value from the blockchain network according to the version number index value, and use the target contract version number as the contract version number corresponding to the contract call request.

In some embodiments of the present disclosure, the calling unit 1508 is further configured to execute, through the call interface of the target smart contract, target contract code corresponding to the call interface in the target smart contract, to perform a contract operation corresponding to the contract call request.

Figure 16:
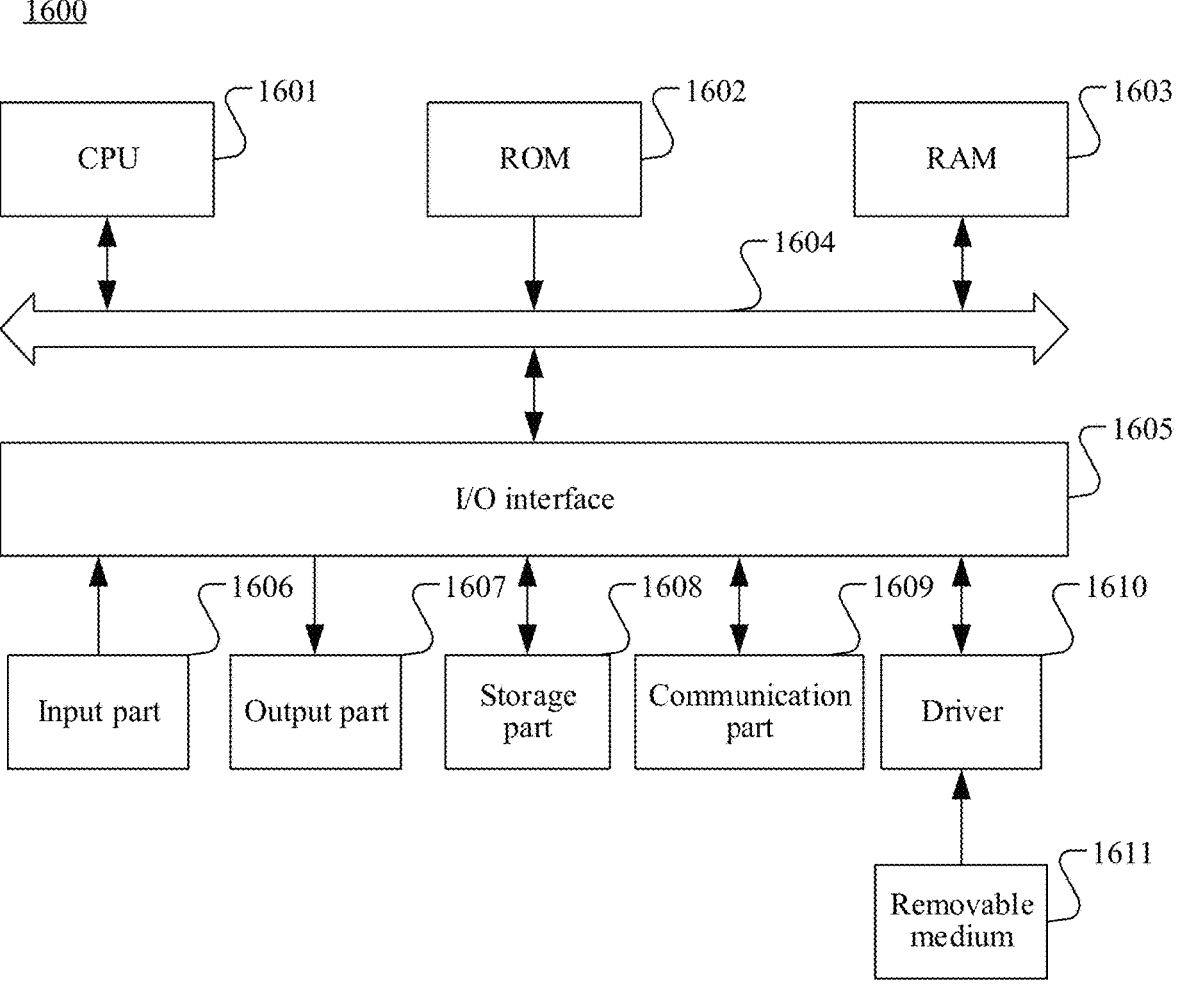
FIG. 16 is a schematic structural diagram of a computer system of an electronic device according to certain embodiment(s) of the present disclosure.

FIG. 16 is a schematic structural diagram of a computer system adapted to implement an electronic device according to an embodiment of the present disclosure. The computer system 1600 of the electronic device shown in FIG. 16 is merely an example, and does not constitute any limitation on functions and use ranges of the embodiments of the present disclosure. The electronic device includes a processor and a storage apparatus. The processor of the electronic device may be a central processing unit (CPU) for providing computing and control capabilities. The storage apparatus of the electronic device may include a read-only memory (ROM), a random access memory (RAM), and the storage apparatus includes a non-volatile storage medium and an internal memory. The non-volatile storage medium stores an operating system and computer-readable instructions. The internal memory provides an environment for running of the operating system and the computer-readable instruction in the non-volatile storage medium.

As shown in FIG. 16, the computer system 1600 includes a CPU 1601, which can perform various appropriate actions and processing, such as performing the methods described in the above embodiments, according to a program stored in a ROM 1602 or a program loaded into a RAM 1603 from a storage part 1608. The RAM 1603 further stores various programs and data required for operating the system. The CPU 1601, the ROM 1602, and the RAM 1603 are connected to each other through a bus 1604. An input/output (I/O) interface 1605 is also connected to the bus 1604.

The following components are connected to the I/O interface 1605: an input part 1606 including a keyboard, a mouse, and the like; an output part 1607 including a cathode ray tube (CRT), a liquid crystal display (LCD), a speaker, and the like; a storage part 1608 including a hard disk and the like; and a communication part 1609 including a network interface card such as a local area network (LAN) card, a modem, and the like. The communication part 1609 performs communication processing by using a network such as the Internet. A driver 1610 is also connected to the I/O interface 1605 as required. A removable medium 1611, such as a magnetic disk, an optical disc, a magneto-optical disk, or a semiconductor memory, is installed on the drive 1610 as required, so that a computer-readable instruction read from the removable medium is installed into the storage part 1608 as required.

Particularly, according to an embodiment of the present disclosure, the processes described in the following by referring to the flowcharts may be implemented as computer software programs. For example, an embodiment of the present disclosure includes a computer program product. The computer program product includes a computer-readable instruction carried on a computer-readable medium. A computer program includes a computer-readable instruction used for performing the method shown in the flowchart. In such an embodiment, by using the communication part 1609, the computer program may be downloaded and installed from a network, and/or installed from the removable medium 1611. When the computer program is executed by the CPU 1601, the various functions defined in the system of the present disclosure are executed.

The computer-readable medium shown in the embodiments of the present disclosure may be a computer-readable signal medium or a computer-readable storage medium or any combination of the two. For example, the computer-readable storage medium may be, but is not limited to, an electric, magnetic, optical, electromagnetic, infrared, or semi-conductive system, apparatus, or device, or any combination thereof. More specific examples of the computer-readable storage medium may include, but are not limited to, an electrical connection having one or more wires, a portable computer magnetic disk, a hard disk, a random access memory (RAM), a read-only memory (ROM), an erasable programmable read-only memory (EPROM), a flash memory, an optical fiber, a compact disk read-only memory (CD-ROM), an optical storage device, a magnetic storage device, or any appropriate combination thereof.

In the present disclosure, the computer-readable storage medium may be any tangible medium containing or storing a computer-readable instruction, and the computer-readable instruction may be used by or used in combination with an instruction execution system, apparatus, or device. In the present disclosure, a computer-readable signal medium may include a data signal in a baseband or propagated as a part of a carrier wave, the data signal carrying a computer-readable instruction. The propagated data signal may be in a plurality of forms, including, but not limited to, an electromagnetic signal, an optical signal, or any appropriate combination thereof. The computer-readable signal medium may alternatively be any computer-readable medium other than the computer-readable storage medium. The computer-readable medium may send, propagate, or transmit a computer-readable instruction used by or used in combination with an instruction execution system, apparatus, or device. The computer-readable instruction included in the computer-readable medium may be transmitted using any appropriate medium, including but not limited to: a wireless medium, a wired medium, or any suitable combination thereof.

The flowcharts and block diagrams in the accompanying drawings illustrate architectures, functions, and operations that may be implemented by a system, a method, and a computer program product according to various embodiments of the present disclosure. Each box in the flowchart or block diagram may represent a module, a program segment, or a part of code. The module, the program segment, or the part of code includes one or more executable instructions used for implementing designated logic functions. In some implementations used as substitutes, functions annotated in boxes may alternatively occur in a sequence different from that annotated in an accompanying drawing. For example, two boxes shown in succession may be performed in parallel actually, and sometimes the two boxes may be performed in a reverse sequence, which is determined according to a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

A related unit described in the embodiments of the present disclosure may be implemented in a software manner, or may be implemented in a hardware manner, and the unit described may alternatively be set in a processor. Names of the units do not constitute a limitation on the units in a specific scenario.

In another aspect, the present disclosure further provides a computer-readable medium. The computer-readable medium may be included in the electronic device described in the above embodiments, or may exist alone without being assembled into the electronic device. The computer-readable medium carries one or more computer-readable instructions. The one or more computer-readable instructions, when executed by the electronic device, cause the electronic device to implement the method described in the embodiments.

Although several modules or units of a device configured to perform actions are discussed in the detailed description, the division is not mandatory. Actually, according to the implementations of the present disclosure, the features and functions of two or more modules or units described above may be implemented in one module or unit. Conversely, the features and functions of one module or unit described above may be further divided into a plurality of modules or units for implementation.

Through the descriptions of the implementations, a person skilled in the art easily understands that the exemplary implementations described herein may be implemented through software, or may be implemented through software in combination with suitable hardware. Therefore, the technical solutions of the implementations of the present disclosure may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to the embodiments of the present disclosure.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

After considering the present disclosure and practicing the disclosed implementations, a person skilled in the art may easily figure out other implementation solutions of the present disclosure. The present disclosure is intended to cover any variations, uses or adaptive changes of the present disclosure. The variations, uses or adaptive changes follow the general principles of the present disclosure, and include well-known knowledge and technical means in the art that are not disclosed in the present disclosure.

It is to be understood that the present disclosure is not limited to the precise structures described above and shown in the accompanying drawings, and various modifications and changes can be made without departing from the scope of the present disclosure. The scope of the present disclosure is limited only by the appended claims.

What is claimed is:

1. A method for publishing a smart contract, performed by a client, the method comprising:

generating a version number index value according to a contract name of the smart contract, and searching for an associated target contract version number from a blockchain network according to the version number index value, the target contract version number being indicative of a largest-numbered version of the smart contract already recorded in the blockchain network; and in response to determining that the contract version number of the first version of the smart contract to be published is greater than the target contract version number;

generating a contract index value according to a contract version number of a first version of the smart contract and the contract name;

associating the contract index value with executable contract code of the first version of the smart contract and associating the version number index value with the contract version number of the first version of the smart contract, to generate transaction information; and publishing the transaction information to the blockchain network, to publish the first version of the smart contract to the blockchain network, the publishing the first version of the smart contract to the blockchain network comprising causing the executable contract code of the first version of the smart contract to be recorded in the blockchain network, wherein subsequent to the publishing of the first version of the smart contract to the blockchain network, the blockchain network records a first mapping relationship between the contract index value and the executable contract code of the first version of the smart contract, and a second mapping relationship between the version number index value and the contract version number of the first version of the smart contract, the second mapping relationship comprises a key-value pair entry stored in the blockchain network, the version number index value being a key of the key-value pair entry, the contract version number of the first version of the smart contract being a value of the key-value pair entry.

2. The method according to claim 1, wherein generating the version number index value comprises:

performing a hash calculation according to the contract name of the smart contract to obtain a first hash value, and using the calculated first hash value as the version number index value.

3. The method according to claim 1, wherein generating the contract index value comprises:

performing a hash calculation according to the contract version number of the first version of the smart contract and the contract name to obtain a second hash value, and using the calculated second hash value as the contract index value.

4. The method according to claim 1, wherein searching for the associated target contract version number comprises:

searching for at least one associated contract version number from the blockchain network according to the version number index value; and using a largest contract version number in the at least one contract version number as the target contract version number.

5. The method according to claim 1, further comprising:

generating the contract index value according to the contract version number of the first version of the smart contract and the contract name, in response to determining that no associated target contract version number is found from the blockchain network according to the version number index value;

associating the contract index value with the executable contract code of the first version of the smart contract and associating the version number index value with the contract version number of the first version of the smart contract, to generate transaction information; and publishing the transaction information to the blockchain network, to publish the first version of the smart contract to the blockchain network.

6. The method according to claim 1, further comprising:

terminating publishing of the first version of the smart contract to the blockchain network, in response to determining that the contract version number of the first version of the smart contract is less than or equal to the target contract version number.

7. The method according to claim 1, further comprising:

verifying the executable contract code of the first version of the smart contract; and publishing the transaction information to the blockchain network comprises: publishing the transaction information to the blockchain network in response to determining that verification of the executable contract code of the first version of the smart contract succeeds.

8. The method according to claim 7, wherein verifying the executable contract code of the first version of the smart contract comprises:

creating a corresponding virtual machine according to a contract type of the smart contract;

executing the executable contract code of the first version of the smart contract by the virtual machine; and determining that the verification of the executable contract code succeeds in response to determining that the virtual machine returns a result that the first version of the smart contract is successfully executed after executing the executable contract code of the first version of the smart contract.

9. The method according to claim 1, further comprising:

obtaining owner information of the smart contract corresponding to the target contract version number; and performing the process of publishing the transaction information to the blockchain network in response to determining that the owner information matches publisher information of the first version of the smart contract.

10. A method for calling a first smart contract, performed by a blockchain node, the method comprising:

receiving a contract call request sent by a call requestor, the contract call request including a name of the first smart contract;

generating a first contract index value according to the name of the first smart contract and a contract version number corresponding to the contract call request;

querying a target smart contract associated with the first contract index value from published smart contracts in a blockchain network according to the first contract index value, wherein the blockchain network records, for each published version of each published smart contract, executable contract code of the published version of the published smart contract and a first mapping relationship between a contract index value and the executable contract code of the published version of the published smart contract, and, for each published smart contract, a second mapping relationship between a version number index value and a contract version number of a published largest-numbered version of the published smart contract already recorded in the blockchain network, the second mapping relationship comprises a key-value pair entry stored in the blockchain network, the version number index value being a key of the key-value pair entry, the contract version number of the published largest-numbered version of the published smart contract being a value of the key-value pair entry; and calling the target smart contract to perform a corresponding contract operation according to a call interface of the target smart contract.

11. The method according to claim 10, further comprising:

using a first version number of the first smart contract as the contract version number corresponding to the contract call request, in response to determining that the contract call request includes the first version number of the first smart contract.

12. The method according to claim 10, comprising:

generating a first version number index value according to the name of the first smart contract, in response to determining that the contract call request does not include any version number of the first smart contract; and searching for a target contract version number associated with the first version number index value from the blockchain network according to the first version number index value, and using the target contract version number as the contract version number corresponding to the contract call request, the target contract version number being indicative of a largest-numbered version of the first smart contract already recorded in the blockchain network.

13. The method according to claim 10, wherein calling the target smart contract comprises:

executing, through the call interface of the target smart contract, executable target contract code corresponding to the call interface in the target smart contract, to perform the contract operation corresponding to the contract call request.

14. An apparatus for publishing a smart contract, comprising: a memory storing computer program instructions; and a processor coupled to the memory and configured to execute the computer program instructions and perform:

generating a version number index value according to a contract name of the smart contract, and searching for an associated target contract version number from a blockchain network according to the version number index value, the target contract version number being indicative of a largest-numbered version of the smart contract already recorded in the blockchain network;

in response to determining that the contract version number of the first version of the smart contract to be published is greater than the target contract version number:

generating a contract index value according to a contract version number of a first version of the smart contract and the contract name;

associating the contract index value with executable contract code of the first version of the smart contract and associating the version number index value with the contract version number of the first version of the smart contract, to generate transaction information; and publishing the transaction information to the blockchain network, to publish the first version of the smart contract to the blockchain network, the publishing the first version of the smart contract to the blockchain network comprising causing the executable contract code of the first version of the smart contract to be recorded in the blockchain network, wherein subsequent to the publishing of the first version of the smart contract to the blockchain network, the blockchain network records a first mapping relationship between the contract index value and the executable contract code of the first version of the smart contract, and a second mapping relationship between the version number index value and the contract version number of the first version of the smart contract, the second mapping relationship comprises a key-value pair entry stored in the blockchain network, the version number index value being a key of the key-value pair entry, the contract version number of the first version of the smart contract being a value of the key-value pair entry.

15. The apparatus according to claim 14, wherein the processor is further configured to execute the computer program instructions and perform:

searching for at least one associated contract version number from the blockchain network according to the version number index value; and using a largest contract version number in the at least one contract version number as the target contract version number.

16. The apparatus according to claim 14, wherein the processor is further configured to execute the computer program instructions and perform:

verifying the executable contract code of the first version of the smart contract to be published; and publishing the transaction information to the blockchain network in response to determining that verification of the executable contract code of the first version of the smart contract succeeds.

17. The apparatus according to claim 14, wherein the processor is further configured to execute the computer program instructions and perform:

performing a hash calculation according to the contract name of the smart contract to obtain a first hash value, and using the calculated first hash value as the version number index value.

18. The apparatus according to claim 14, wherein the processor is further configured to execute the computer program instructions and perform:

performing a hash calculation according to the contract version number of the first version of the smart contract and the contract name to obtain a second hash value, and using the calculated second hash value as the contract index value.

19. The apparatus according to claim 14, wherein the processor is further configured to execute the computer program instructions and perform:

terminating publishing of the first version of the smart contract to the blockchain network, in response to determining that the contract version number of the first version of the smart contract is less than or equal to the target contract version number.

20. The apparatus according to claim 14, wherein the processor is further configured to execute the computer program instructions and perform:

obtaining owner information of the smart contract corresponding to the target contract version number; and performing the process of publishing the transaction information to the blockchain network in response to determining that the owner information matches publisher information of the first version of the smart contract.

\* \* \* \* \*